United States Patent [19]

Kirschner et al.

[11] Patent Number: 5,160,547
[45] Date of Patent: Nov. 3, 1992

[54] PROCESS FOR REMOVING COATINGS FROM SENSITIVE SUBSTRATES, AND BLASTING MEDIA USEFUL THEREIN

[75] Inventors: Lawrence Kirschner, Flanders; Michael S. Lajoie, Basking Ridge, both of N.J.; William E. Spears, Jr., Houston, Tex.

[73] Assignee: Church & Dwight Co., Inc., Princeton, N.J.

[21] Appl. No.: 702,049

[22] Filed: May 17, 1991

Related U.S. Application Data

[63] Continuation-in-part of Ser. No. 323,412, Mar. 14, 1989, abandoned, and a continuation-in-part of Ser. No. 506,447, Apr. 6, 1990, abandoned.

[51] Int. Cl.$^5$ .......................... B08B 7/00; C09K 3/14
[52] U.S. Cl. .......................... 134/7; 134/38; 51/307; 51/308; 252/7
[58] Field of Search .............. 134/7, 38; 51/307, 308, 51/319, 320; 252/7

[56] References Cited

U.S. PATENT DOCUMENTS

| | | | |
|---|---|---|---|
| 4,174,571 | 11/1979 | Gallant | 51/548 |
| 4,251,579 | 2/1981 | Lee et al. | 428/73 |
| 4,588,444 | 5/1986 | Anderson | 134/7 |

FOREIGN PATENT DOCUMENTS 532346  10/1956  Canada ................................ 134/7

*Primary Examiner*—Theodore Morris
*Assistant Examiner*—Saeed T. Chaudhry
*Attorney, Agent, or Firm*—Bryan Cave

[57] ABSTRACT

Blasting media for removing coatings from sensitive metal and composite surfaces, and a process useful therewith, wherein the blasting media comprise mixtures of water-soluble crystalline sodium bicarbonate particles having average particle sizes of from 100-500 microns.

5 Claims, 2 Drawing Sheets

5,160,547

PROCESS FOR REMOVING COATINGS FROM SENSITIVE SUBSTRATES, AND BLASTING MEDIA USEFUL THEREIN

PARENT APPLICATIONS

This application is a continuation-in-part of U.S. patent application Ser. No. 07/323,412 filed Mar. 14, 1989 abandoned and application Ser. No. 07/506,447 filed Apr. 6, 1990 abandoned May 30, 1991.

FIELD OF THE INVENTION

This invention relates to a process for removing coatings from sensitive metal and composite surfaces or like substrates, and to blasting media useful therein.

BACKGROUND OF THE INVENTION

It is often desirable to clean or remove coatings from the surfaces of various types of structures and equipment, varying from buildings to industrial devices. Numerous techniques are known for such purposes, ranging from mechanical abrasion techniques to the application of chemicals for cleaning or removing surface coatings such as paint, sealants, lacquers or the like. Hard, durable surfaces, such as granite walls or heavy steel plating may be cleaned or stripped by vigorous abrasive techniques such as sand blasting. More delicate surfaces may require less aggressive treatments to prevent damage to the substrates.

Both commercial airlines and military agencies spend large sums in periodically stripping or abrading paint and other coatings from the exterior surfaces of modern aircraft. These surfaces comprise light weight aluminum or other metal alloys, or composites, which are relatively soft and from which paint or other coatings must be carefully removed to avoid excessive abrasion or chemical damage. Such damage may, in extreme cases, lead to mechanical failure.

Various improved stripping techniques, similar to sand blasting, have been proposed for removing coatings from sensitive metal and composite aircraft or like surfaces. Blasting media useful for such purposes should, preferably, meet the following criteria:

1. They should be relatively non-aggressive (Mohs hardness of about 2.0–3.0);
2. They should be available in various particle size distributions for the treatment of different substrates;
3. They should be free-flowing under high humidity conditions and throughout a broad range of air pressure and media flow rates; and
4. They should be water soluble and non-polluting to facilitate easy separation from the insoluble paints and resins stripped to facilitate waste disposal.

Carr U.S. Pat. No. 4,731,125 granted Mar. 15, 1988 describes the use of plastic media for the blast cleaning of sensitive metal and composite surfaces. Such materials are however, relatively expensive, and their use may impose waste disposal problems.

Sodium bicarbonate has also been proposed as a blasting medium for removing coatings from sensitive substrates such as aircraft parts. Bicarbonate is an ideal choice for such a medium since it readily meets criteria 1, 2 and 4 above. Thus, it is relatively non-aggressive (Mohs hardness of about 2.5), is available in a variety of particle sizes, and is both water soluble and commonly utilized to treat sewage treatment facilities for the control of alkalinity and pH. The mild abrasive characteristics of sodium bicarbonate have previously been utilized, for example, in polishing media for teeth. See, for example, U.S. Pat. Nos. 3,882,638; 3,972,123; 4,174,571; 4,412,402; 4,214,871; 4,462,803; 4,482,322; 4,487,582; 4,492,575; 4,494,932, and 4,522,597.

The principal disadvantage attendant to the use of sodium bicarbonate as a blasting medium is its tendency to cake either by compaction or, more importantly, by exposure to high humidity conditions. This is particularly acute in commercial blasting operations, the compressed air streams for which are substantially saturated with moisture, i.e., have 90% or higher relative humidities, and contain oily contaminants from air compressors. In addition, commercially available sodium bicarbonate products have intrinsically poor flow characteristics due to their normal particle size distributions and crystal shapes.

The addition of flow aids to sodium bicarbonate to improve its flow and anti-caking properties is known. Thus, the blending of tricalcium phosphate (TCP) with sodium bicarbonate in baking formulas and dental air jet prophylaxis media has previously been proposed. The addition of such material substantially improves the flow and anti-caking characteristics of the bicarbonate. TCP-treated sodium bicarbonate is however, restricted to a 3 to 6 month shelf life under ambient conditions, since the TCP absorbs moisture until saturated, after which the product cakes.

It is, accordingly, among the objects of the present invention to provide bicarbonate-containing blasting media, and a process utilizing such media for removing coatings from sensitive metal and composite surfaces. Bicarbonate blasting media which may be so utilized are free flowing and have long storage lives under adverse commercial blasting conditions, and may be utilized as blasting media at high humidities and under a broad range of finely controlled, high flow rates and air pressures. Other objects and advantages of the invention will be apparent from the following description of preferred forms thereof.

SUMMARY OF THE INVENTION

In accordance with this invention, a process for removing coatings from sensitive substrates is provided, comprising blasting such surfaces with a high velocity water-containing fluid stream, desirably a substantially water-saturated compressed air stream, under a pressure of about 10–150 psi, containing as a blasting medium crystalline water-soluble bicarbonate particles having average particle sizes within the range of about 100–500, preferably about 250–300, microns, desirably in admixture with at least about 0.2%, preferably about 0.2–3%, of a hydrophobic silica flow/anti-caking agent, by weight of the bicarbonate.

The relatively large particle size bicarbonate has been found quite effective in removing corrosion by-products as well as other coatings from substrates, without damage to the substrate. This contravenes the conventional wisdom that small particles of a blasting medium, which have more available surface area, are more effective cleaning agents than larger particles. Moreover, in most prior blasting applications higher feed rates of the blasting material lead to higher production rates, i.e., faster removal of the coating. However, employing the crystalline bicarbonate medium within the indicated particle size range it is possible to achieve economical production rates at feed rates of about three to four pounds per minute using conventional sand blasting equipment sized to effectively use a 0.5 inch diameter nozzle. Above these rates, very little increase in production rate is obtained even employing markedly higher bicarbonate blasting medium feed rates.

In accordance with a further feature of the invention, the addition of hydrophobic silica to the blasting medium imparts significantly better flow characteristics than comparable media which are either free of flow aids or which contain other conventional flow aids such as TCP or hydrophilic silica. In addition, bicarbonate blasting media incorporating the hydrophobic silica flow aid have significantly longer, substantially indefinite shelf lives, and exhibit superior resistance to the high relative humidities of commercial compressed air streams.

It is preferred to utilize crystalline sodium bicarbonate as the abrasive material in the blasting media of this invention. It is, however, intended that other crystalline water-soluble bicarbonates, e.g., alkali metal bicarbonates such as potassium bicarbonate, or ammonium bicarbonate may similarly be employed. Accordingly, while the following description principally refers to the preferred crystalline sodium bicarbonate-containing blasting media, it will be understood that the invention embraces blasting media incorporating other water-soluble crystalline bicarbonate abrasives as well.

Hydrophobic silica has previously been utilized in admixture with hydrophilic silica as a flow aid in polishing media for dental prophylaxis. Such media are applied under conditions which differ dramatically from commercial blasting media. Thus, dental prophylaxis media contain bicarbonate particles having particle sizes of about 65-70 microns, and are applied at rates of about 3 grams per minute through 1/16-1/32 inch nozzles under the pressure of clean, laboratory compressed air supplies under pressures of about 50-100 psi. Most important, such air supplies are not substantially saturated with moisture, and present quite different flow and caking problems from those inherent in the application of commercial blasting media at high thruputs in saturated compressed air blast streams.

The blasting media of the invention consist essentially of the crystalline water-soluble bicarbonate, e.g., sodium bicarbonate, in admixture with hydrophobic silica particles. Hydrophobic silica, unlike known hydrophilic silicas, is substantially free of non-hydrogen bonded silanol groups and absorbed water.

One preferred hydrophobic silica which may be utilized in the blasting media hereof is Aerosil R 972, a product which is available from Degussa AG. This material is a pure coagulated silicon dioxide aerosol, in which about 75% of the silanol groups on the surface thereof are chemically reacted with dimethyldichlorosilane, the resulting product having about 0.7 mmol of chemically combined methyl groups per 100m$^2$ of surface area and containing about 1% carbon. Its particles vary in diameter between about 10-40 nanometers and have a specific surface area of about 110 m$^2$/gram. It may be prepared by flame hydrolysis of a hydrophilic silica as more fully described in Angew. Chem. 72, 744 (1960); F-PS 1,368,765; and DT-AS 1,163,784. Further details respecting such material are contained in the technical bulletin entitled "Basic Characteristics and Applications of AEROSIL", Degussa AG, August 1986.

The hydrophobic silica particles are admixed with the crystalline sodium bicarbonate blasting agent in the proportion of at least about 0.2%, and up to about 3% by weight thereof. The crystalline bicarbonate particles may be of any desired average particle size, within the range of from about 100 to 500 microns. Preferably, when the blasting medium is utilized for the removal of paint from exterior aircraft surfaces, it is preferred to utilize crystalline bicarbonate particles having average particle sizes of about 250-300 microns.

Blasting media thus constituted are useful for cleaning or de-coating sensitive metals, e.g., aluminum or aluminum alloys, or composite substrates, such as utilized on exterior aircraft surfaces, without abrading or otherwise damaging the substrates. Composites which can be treated with the blasting media hereof comprise matrices, e.g., epoxy resins, which may contain fibers such as glass strands, graphite or the like for reinforcement.

The blasting medium thus constituted is preferably applied in commercial compressed air streams, i.e., streams which are substantially saturated with moisture (90% or higher relative humidities) and contain oil contaminants from compressors. A stream of water may be added to the media/air stream to cool the workpiece and control dust formation, although the addition of water may reduce the coating removal rate somewhat. The bicarbonate/hydrophobic silica blasting medium may be applied at flow rates of about 1-10, desirably about three to four, pounds per minute and under air pressures of about 10-150 psi, from 1/4 inch or larger blasting nozzles.

As indicated above, and as more fully documented below, in accordance with the present invention it has been found that blasting media so constituted and employed do not cake, have excellent shelf lives, and are free-flowing. They may thus be readily employed in commercial blasting operations for removing coatings from sensitive metal and composite surfaces.

DETAILED DESCRIPTION OF THE PREFERRED EMBODIMENTS

Figure 1:
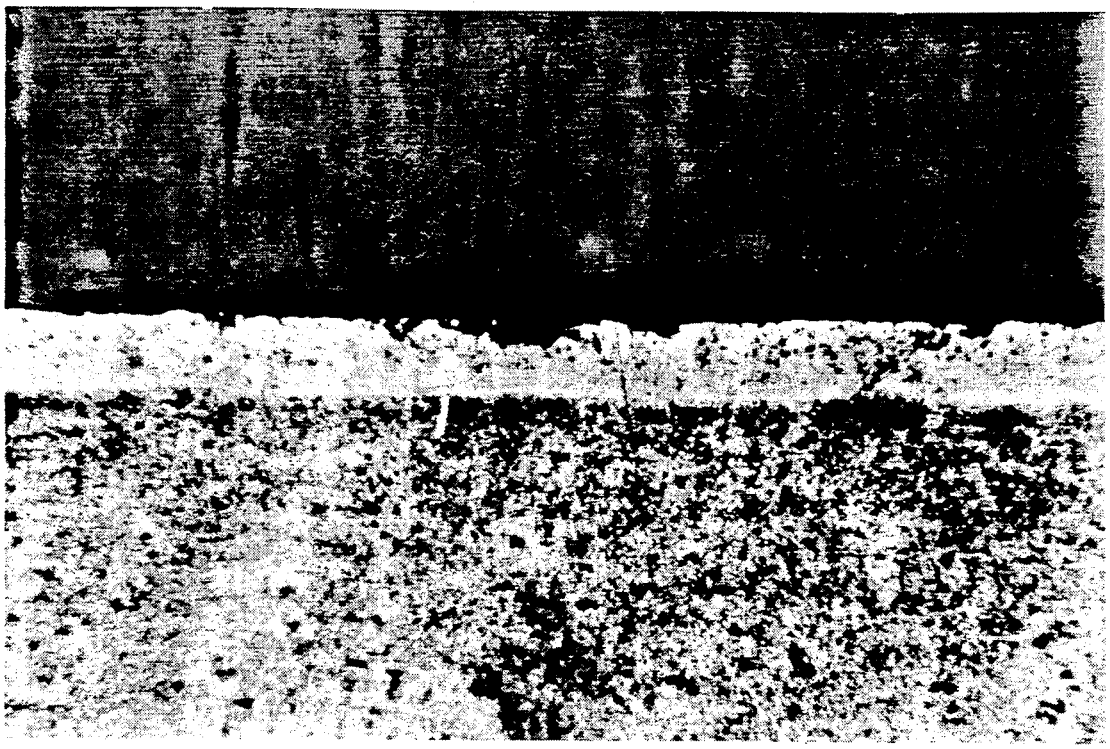
FIG. 1 is an electron scanning photomicrograph of a clad aluminum test panel which has visible corrosion at the surface, penetrating the cladding, prior to blasting.
Figure 2:
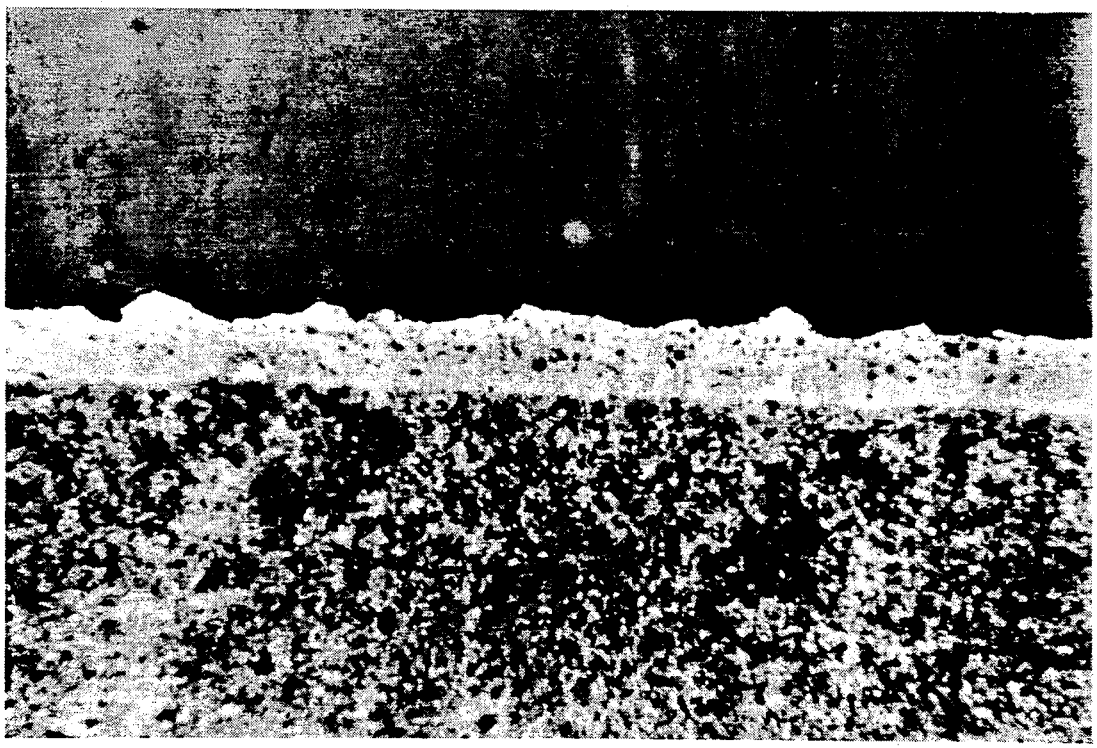
FIG. 2 is an electron scanning photomicrograph of a clad aluminum test panel which has been cleaned according to the process of the invention. It is apparent that the surface corrosion by-product materials have been removed without damaging the metal surface.

The following examples illustrate the free-flowing characteristics of (Example 1), and the high production rates obtained by (Examples 2 and 3), the blasting media of the present invention. In the examples, all parts and percentages are given by weight and all temperatures in ° F. unless otherwise indicated.

EXAMPLE 1

Application of Hydrophobic Silica-Containing Blasting Media

Two crystalline sodium bicarbonate samples, each having an average particle size of about 250-300 microns, and one in admixture with 0.5% Aerosil R-972 hydrophobic silica, were used as media in a standard sand blasting apparatus. The apparatus was a Schmidt Accustrip System, manufactured by Schmidt Manufacturing, Inc. of Houston, Texas, having a 0.5 inch nozzle diameter and a Thompson valve connected to a 6 cubic foot blast pot and an 800 cfm compressor. The blast pot was mounted on a scale so that media flow rates could be determined.

The respective bicarbonate formulations were blasted through the nozzle at 60 psig pressure utilizing ambient compressed air which was saturated with moisture as it passed through the blasting media in the blast pot.

The crystalline sodium bicarbonate particles absent the hydrophobic silica flow aid flowed intermittently through the system, rapidly clogging the nozzle and preventing further flow. Sustained flow could not be maintained.

The crystalline bicarbonate-hydrophobic silica formulation flowed continuously through the system for more than 65 hours at controllable rates varying from 1 pound per minute to 5 pounds per minute. No flow problems were encountered therewith.

EXAMPLE 2

Application of Blasting Media at Varying Production Rates

Test panels of aluminum, two feet by two feet by 0.032 inch thick, were cleaned by treating with water, washing with phosphoric acid solution, rinsing with water, applying Alodyne corrosion inhibitor, and rinsing with a final water rinse. An epoxide primer was applied and the panels were dried in air for eight hours. A polyurethane paint was then applied and the panels were dried for seven days. The panels were then aged for 96 hours in an air oven at 210° F. The target thickness for the paint and primer was 2 mils.

Various sodium bicarbonate blasting media were loaded into a blast pot fitted with an appropriate orifice plate to regulate the rate of flow of the blast medium. The blasting media consisted of 99.5% sodium bicarbonate (in differing particle sizes) and 0.5% Aerosil R972 hydrophobic silica. The nozzle pressure was set at 60 psi and the media were placed under differential pressure sufficient to give the desired feed rate. The water pressure was set at a pressure of 200 psi, yielding a flow of 0.5 gal/min. The angle the blast nozzle made with the workpiece was set at 60°. The media feed rates were varied from two to four lbs/min.

The time to completely depaint the panels were recorded.

The production (depainting) rates and average particle sizes of the bicarbonates in the respective media were as follows:

|  | Particle Size, microns | | | |
|---|---|---|---|---|
|  | 65 | 90 | 150 | 250 |
|  | Production Rates (Depainting Times) | | | |
| Feed Rate 2 lb./min | .75 | 1.3 | 1.4 | 1.6 |
| Feed Rate 3 lb./min | 1.0 | 1.7 | 1.8 | 2.0 |
| Feed Rate 4 lb./min | 1.2 | 1.9 | 2.0 | 2.2 |

Figure 3:
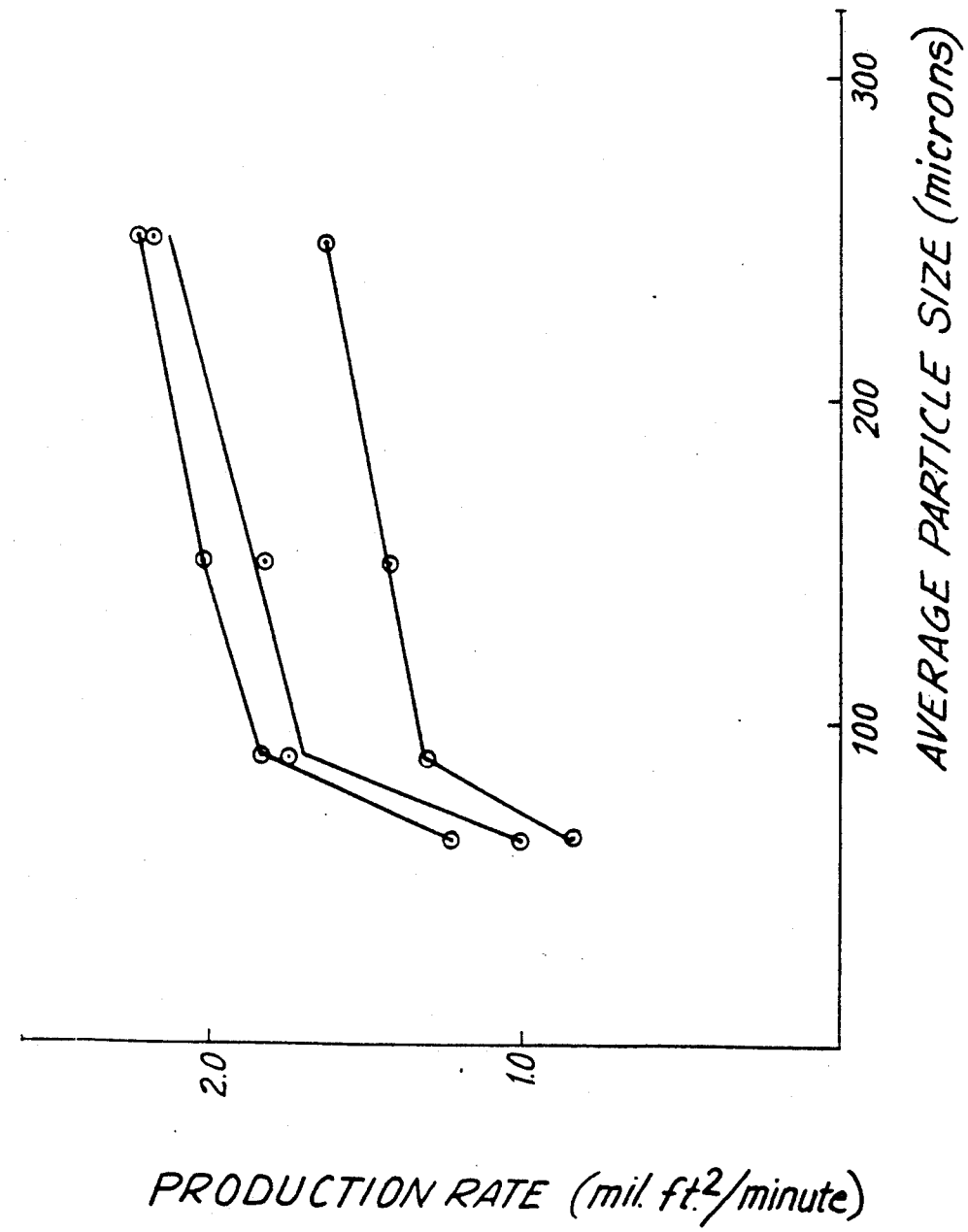
FIG. 3 is a graph comparing production rates obtained employing bicarbonate blasting media having different average particle sizes, at varying feed rates.

This data is summarized in FIG. 3, wherein curve 1 is 2 lbs/min; curve 2 is 3 lb/min; and curve 3 is 4 lb/min.

The data shows that media incorporating the larger sodium bicarbonate average particle sizes (150 and 250 microns) were more effective at all feed rates than media containing smaller particles.

It is also apparent that economical production is achieved at a medium flow rate of about three pounds per minute and that higher feed rates produce little improvement in production rate.

EXAMPLE 3

Application of Blasting Media Containing Crystalline vs. Compacted Sodium Bicarbonate The blasting medium described in Example 1, incorporating a crystalline sodium bicarbonate having an average particle size of about 250–300 microns, in admixture with 0.5% Aerosil R-972 hydrophobic silica, was compared with a blasting medium incorporating a compacted bicarbonate, having particles in the range of −20 mesh to +40 mesh, in admixture with a like amount (0.5%) of the same hydrophobic silica flow aid. The respective media were utilized to depaint aluminum test panels in the manner described in Example 2. The maximum production (depainting) rates obtained with the respective media were determined, and are tabulated below. The tabulation shows the improved production rate achieved using the blasting medium incorporating the crystalline sodium bicarbonate rather than the medium incorporating the compacted sodium bicarbonate:

| Blasting Medium Abrasive | Average Particle Size microns | Production Rate ft.$^2$/min |
|---|---|---|
| Crystalline NaHCO3 | 275 | 2.2 |
| Compacted NaHCO3 | 390 | 1.0 |

EXAMPLE 3

Production Rates Obtained By Application of Blasting Media Containing Hydrophobic Silica vs. Hydrophilic Silica Flow Additives One sq. ft. aluminum test panels (standard aircraft aluminum alloy, Al 2024T3 Alclad) coated with an epoxy resin primer and a polyurethane topcoat in accordance with military specifications (MIL-C-83285B and MIL-P-23377E) were subjected to saturated air blasts containing the varying blasting media described below. The media were applied at a flow rate of 3 lbs. per min. under 60 psi blast pressure, with the blast nozzle standing-off from the test panels by 18 in. and utilizing a 60° blast angle. Water was fed into the saturated air blast stream under 200 psi, at a rate of 0.4 gal. per min.

Blasting media containing sodium bicarbonate having 250 micron, 150 micron, and 100 micron approximate average particle sizes were tested. 0.5% hydrophobic silica (Aerosil R 972) or hydrophilic silica (Sylox 15) flow additives were added to the blasting media containing the respective bicarbonate abrasives. The following production (depainting) rates were determined in the respective tests:

| | Blasting Medium | | |
|---|---|---|---|
| Bicarbonate Particles | Flow Additive | Blast Time | Production Rate |
| 250 microns | Hydrophobic Silica | 94 seconds | 2.11 |
| 250 microns | Hydrophilic Silica | 107 seconds | 1.85 |
| 150 microns | Hydrophobic Silica | 107 seconds | 1.85 |
| 150 microns | Hydrophilic Silica | 107 seconds | 1.83 |
| 100 microns | Hydrophobic Silica | 103 seconds | 1.57 |
| 100 microns | Hydrophilic Silica | 114 seconds | 1.53 |

[1]Time required to effect complete coating removal, average of four tests.

[2]In $\frac{\text{mils} \times \text{ft.}^2}{\text{min.}}$, average of four tests.

From the preceding it will be seen that, for blasting media of the same approximate average particle size, the production rate is substantially independent of the particular flow additive utilized.

From the preceding disclosure, it will be seen that the present invention provides an improved process for cleaning or removing paint or other coatings from the surfaces of sensitive substrates, and to crystalline sodium bicarbonate-containing blasting media useful therein. It will be understood that various changes may be made in the blasting process and blasting media exemplified in the preferred embodiments described hereinabove without departing from the scope of the invention. Accordingly, the preceding description should be construed as illustrative and not in a limiting sense.

We claim:

1. A process for removing coatings from sensitive metal and composite surfaces, which comprises blasting said surfaces with a substantially water saturated compressed air stream under pressures of 10–150 psi, said stream containing as a blasting medium sodium bicarbonate particles having particle sizes within the range of 250–300 microns, in admixture with from 0.2 to 3% of a hydrophobic silica flow/anti-caking agent, by weight of the bicarbonate.

2. The process of claim 1, wherein the hydrophobic silica is substantially free of non-hydrogen bonded silanol groups and adsorbed water.

3. The process of claim 1, wherein the blast stream is applied to the surface treated at a rate of 1–10 pounds of the sodium bicarbonate particles per minute.

4. A blasting medium for removing coatings from sensitive metal and composite surfaces, which consists essentially of sodium bicarbonate particles having particle sizes within the range of 250–300 microns, in admixture with from 0.2 to 3% of a hydrophobic silica flow/anti-caking agent, by weight of the bicarbonate.

5. The blasting medium of claim 4, wherein the hydrophobic silica is substantially free of non-hydrogen bonded silanol groups and adsorbed water.

* * * * *